(12) United States Patent
Regel et al.

(10) Patent No.: US 6,265,533 B1
(45) Date of Patent: Jul. 24, 2001

(54) INCREASING THE MOLECULAR WEIGHT OF POLYESTERS

(75) Inventors: Karin Regel, Hueckelhoven; Roland Andernach, Lampertheim; Peter Schwarz, Aachen; Heinz Herbst, Lörrach; Kurt Hoffmann, Weitenau-Steinen; Rudolf Pfaendner, Rimbach; Dirk Simon, Mutterstadt, all of (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/673,742
(22) PCT Filed: Apr. 14, 1999
(86) PCT No.: PCT/EP99/02510
§ 371 Date: Oct. 19, 2000
§ 102(e) Date: Oct. 19, 2000
(87) PCT Pub. No.: WO99/55772
PCT Pub. Date: Nov. 4, 1999

(30) Foreign Application Priority Data

Apr. 24, 1998 (CH) .................................................... 939/98

(51) Int. Cl.⁷ ............................. C08F 6/00; C08K 5/5333
(52) U.S. Cl. ......................... 528/487; 528/488; 528/503; 524/123; 264/211.21; 264/211.23
(58) Field of Search .................................... 528/487, 488, 528/503; 524/123; 264/211.21, 211.23

(56) References Cited

U.S. PATENT DOCUMENTS

| 4,328,174 | * | 5/1982 | Schmidt et al. |
| 4,434,276 | | 2/1984 | Horlbeck et al. ..................... 525/437 |
| 4,778,840 | * | 10/1988 | Linhart et al. ........................ 524/131 |
| 5,191,000 | * | 3/1993 | Fuhr et al. ............................ 524/117 |
| 5,807,932 | * | 9/1998 | Pfaendner et al. ................... 525/423 |

FOREIGN PATENT DOCUMENTS

| 94/24188 | 10/1994 | (WO) . |
| 95/23176 | 8/1995 | (WO) . |
| 96/11978 | 4/1996 | (WO) . |
| 97/30105 | 8/1997 | (WO) . |

OTHER PUBLICATIONS

S. Von Fakirov, Kunststoffe, vol. 74, No. 4, (1984), pp. 218–221.
R.–E. Grützner et al., Kunststoffe, vol. 82, No. 4, (1992), pp. 284–288.

* cited by examiner

Primary Examiner—Samuel A. Acquah
(74) Attorney, Agent, or Firm—Tyler A. Stevenson

(57) ABSTRACT

This invention relates to a process for increasing the molecular weight of polyesters, copolyesters or polyester blends by adding an organic phosphate to the processing apparatus and fusing the mixture to above the melting point, in which process the processing apparatus is a single-screw extruder, twin-screw extruder, planetary-gear extruder, ring extruder or co-kneader having at least one vent zone to which underpressure is applied.

13 Claims, No Drawings

INCREASING THE MOLECULAR WEIGHT OF POLYESTERS

The present invention relates to a process for increasing the molecular weight of polyesters and to the polyesters obtainable by said process.

Polyesters are important engineering plastics having a wide range of possible uses, for example in the form of films, sheets, bottles, fibres and injection moulded articles. They are produced by polycondensation reactions. For technical, thermodynamic or kinetic reasons, the high molecular weights necessary for some applications are frequently not available during synthesis.

Because of chain cleavages, the thermal and photochemical damage through processing and use results mainly in polymer fragments containing functional terminal groups. Since the mechanical and physical properties are crucially dependent on the molecular weight of the polymer, high quality recycling of used polyesters from production wastes, e.g. from fibre production and from the injection moulding sector, is often only possible to a limited extent owing to the reduced molecular weight.

It is, in principle, known to enhance the material properties of used polycondensates or of polycondensates pre-damaged by heat or hydrolysis. These polycondensates can, for example, be subjected to postcondensation in the solid state [S. Fakirov, Kunststoffe 74, 218 (1984) and R. E. Grützner et al., Kunststoffe 82, 284 (1992)]. However, this known method is lengthy and is, moreover, highly sensitive to impurities such as may be present in waste material.

EP-A-0090915 describes a process for condensing poly (alkylene terephthalate) in the solid phase, processing being carried out in the presence of, for example, triphenylphosphite, at a temperature from 25 to 65° C. below the melting point of the poly(alkylene terephthalate) and while passing through an inert gas stream.

WO 94/24188 and WO 95/23176 disclose that the molecular weight of polyesters can be increased by heating a hydroxyphenylalkylphosphonic acid ester or half-ester and a diepoxide or a tetracarboxylic anhydride together with the polyester to above the melting point. It is thus necessary to add at least two components to the polymer in order to achieve the desired effect.

Surprisingly, it has been found that the application of certain processing/extrusion conditions makes it possible to increase the molecular weight of polyesters within a relatively short time without predrying, directly in the processing apparatus in the melt and solely by addition of specific phosphonates. Polyesters having a higher molecular weight are obtained in simple manner.

This increase in molecular weight effects an enhancement of the properties of the poly-esters, for example in the injection moulding and extrusion sectors and, in particular, in the case of recyclates. Using the process of this invention, the molecular weight can be increased in particular in the case of polyester recyclates collected from used technical parts, such as from automotive and electrical applications and from used bottle collections. Recyclates can thus be recycled in high-quality, e.g. in the form of high performance fibre, injection moulded articles, extrusion applications or foams. Such recyclates originate also, for example, from industrial or domestic useful material collections, from production wastes, such as from fibre production, from trimmings or from obligatory returnables, such as collections of PET drinks bottles.

This invention relates to a process for increasing the molecular weight of polyesters, copolyesters or polyester blends by adding one or more than one phosphonate to the processing apparatus and fusing the mixture to above the melting point, in which process the processing apparatus is a single-screw extruder, twin-screw extruder, planetary-gear extruder, ring extruder or Ko-kneader having at least one vent zone to which underpressure is applied.

In the case of copolyesters, the process can be carried out independently of the statistics of the comonomer composition.

The polyesters, copolyesters or their recyclates can be processed without any predrying.

A preferred process is that which comprises applying an underpressure of less than 250 mbar, particularly preferably of less than 100 mbar and, very particularly preferably, of less than 50 mbar to the vent zone.

Another preferred process is that wherein the processing apparatus is a closely intermeshing twin-screw extruder or a ring extruder with screws rotating in the same direction and with a feed section, a transition section, at least one vent zone and a metering zone, the vent zone being separated from the transition section or from a further vent zone by a fusing plug.

This separation via a fusing plug can be effected, for example, by a combination of a kneading and a return screw element.

The processing apparatus preferably has 1–4 vent zones, particularly preferably 1–3.

The processing stretch is preferably 1 to 60 screw diameters, particularly preferably 35 to 48 screw diameters.

The screw revolution rate is preferably from 25 to 1200, particularly preferably from 50 to 250 revolutions per minute.

The maximum throughput is the result of screw diameter, screw speed and drive power. The process of this invention can also be carried out at a throughput lower than the maximum by varying these parameters and/or by adding metering units.

Suitable extruders and kneaders are described, inter alia, in Handbuch der Kunststoffextrusion, Vol. I, editors F. Hensen, W. Knappe and H. Potente, 1989, pages 3–7.

The maximum melt temperature is preferably in the range from 1800 to 320° C., particularly preferably from 220 to 300° C. This temperature depends on the polyesters, copolyesters or polyester blends used. In the case of, for example, polyethylene therephthalate (PET) it is in the range from 250 to 300° C., in the case of polybutylene thereph-thalate (PBT) in the range from 220 to 2700 C, in the case of polyethylene naphthylate (PEN) in the range from 260 to 300° C. and in the case of polytrimethylene terephthalate (PTT) in the range from 220 to 270° C.

Polyester, copolyester or polyester blend recyclates are preferred.

The polyester, i.e. virgin polyester as well as polyester recyclate, can be homo- or copolyesters which are composed of aliphatic, cycloaliphatic or aromatic dicarboxylic acids and diols or hydroxycarboxylic acids.

The polyesters can be prepared both by direct esterification (PTA process) and by transesterification (DMT process). Any known catalyst systems can be used for the preparation.

The aliphatic dicarboxylic acids can contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms and the aromatic and cycloaliphatic hydroxycarboxylic acids 7 to 14 carbon atoms.

The aliphatic diols can contain 2 to 12 carbon atoms, the cycloaliphatic diols 5 to 8 carbon atoms and the aromatic diols 6 to 16 carbon atoms.

Polyoxyalkylene glycols having a molecular weight from 150 to 40000 can also be used.

Aromatic diols are those, wherein two hydroxyl groups are bound to one or to different aromatic hydrocarboxylic radicals.

It is also possible that the polyesters are branched with small amounts, e.g. 0.1 to 3 mol %, based on the dicarboxylic acids present, of more than difunctional monomers (e.g. pentaerythritol, trimellitic acid, 1,3,5-tri(hydroxyphenyl) benzene, 2,4-dihydroxybenzoic acid or 2-(4-hydroxyphenyl)-2-(2,4-dihydroxyphenyl)propane).

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, for example oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids, such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexytdicarboxylic acid.

Suitable aromatic dicarboxylic acids are: in particular terephthalic acid, isophthalic acid, o-phthalic acid, and 1,3-, 1,4-, 2,6- or 2,7-naphthalenedicarboxylic acid, 4,4'-diphenyidicarboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyletherdicarboxylic acid, bis-p-(carboxylphenyl) methane or bis-p-(carboxylphenyl)ethane.

The aromatic dicarboxylic acids are preferred, in particular terephthalic acid, isophthalic acid and 2,6-naphthalenedicarboxylic acid.

Other suitable dicarboxylic acids are the ones containing —CO—NH-groups and described in DE-A2414349. Dicarboxylic acids containing N-heterocyclic rings are also suitable, for example those which are derived from carboxylalkylated, carboxylphenylated or carboxybenzylated monoamine-s-triazinedicarboxylic acids (see DE-A2121184 and 2533675), mono- or bishydantoins, optionally halogenated benzimidazoles or parabanic acid. The carboxyalkyl groups can in this case contain 3 to 20 carbon atoms.

Suitable aliphatic diols are the linear and branched aliphatic glycols, in particular those containing 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is, for example, 1,4-dihydroxycyclohexane. Other suitable aliphatic diols are, for example, 1,4-bis(hydroxymethyl)-cyclohexane, aromatic-aliphatic diols, such as p-xylylene glycol or 2,5-dichloro-p-xylylene glycol, 2,2-(β-hydroxyethoxyphenyl)propane and polyoxyalkylene glycols, such as diethylene glycol, triethylene glycol, polyethylene glycol or polypropylene glycol. The alkylenediols are preferably linear and preferably contain 2 to 4 carbon atoms.

Preferred diols are the alkylenediols, 1,4-dihydroxycyclohexane and 1,4-bis(hydroxymethyl)-cyclohexane. Ethylene glycol, 1,4-butanediol, and 1,2- and 1,3-propylene glycol are particularly preferred.

Other suitable aliphatic diols are the β-hydroxyalkylated, in particular β-hydroxyethylated bisphenots, such as 2,2-bis [4'-(β-hydroxyethoxy)phenyl]propane. Other bisphenols will be mentioned below.

Another group of suitable aliphatic diols are the heterocyclic diols described in the German published patent specifications 1812003, 2342432, 2342372 and 2453326. Examples are: N,N'-bis(β-hydroxyethyl)-5,5-dimethylhydantoin, N,N'-bis(β-hydroxypropyl)-5,5-dimethylhydantoin, methylenebis-[N-(β-hydroxyethyl)-5-methyl-5-ethylhydantoin], methylenebis-[N-(β-hydroxyethyl)-5,5-dimethylhydantoin], N,N'-bis(β-hydroxyethyl)benzimidazolone, N,N'-bis(β-hydroxyethyl)-(tetrachloro)benzimidazolone or N,N'-bis(β-hydroxyethyl)-(tetrabromo)benzimidazolone.

Suitable aromatic diols are mononuclear diphenols and, in particular, dinuclear diphenols carrying a hydroxyl group at each aromatic nucleus. The term aromatic will be taken to mean preferably hydrocarbonaromatic radicals such as phenylene or naphthylene. Besides e.g. hydroquinone, resorcinol or 1,5-, 2,6- and 2,7-dihydroxynaphthalene, bisphenols merit particular mention, which can be represented by the following formulae:

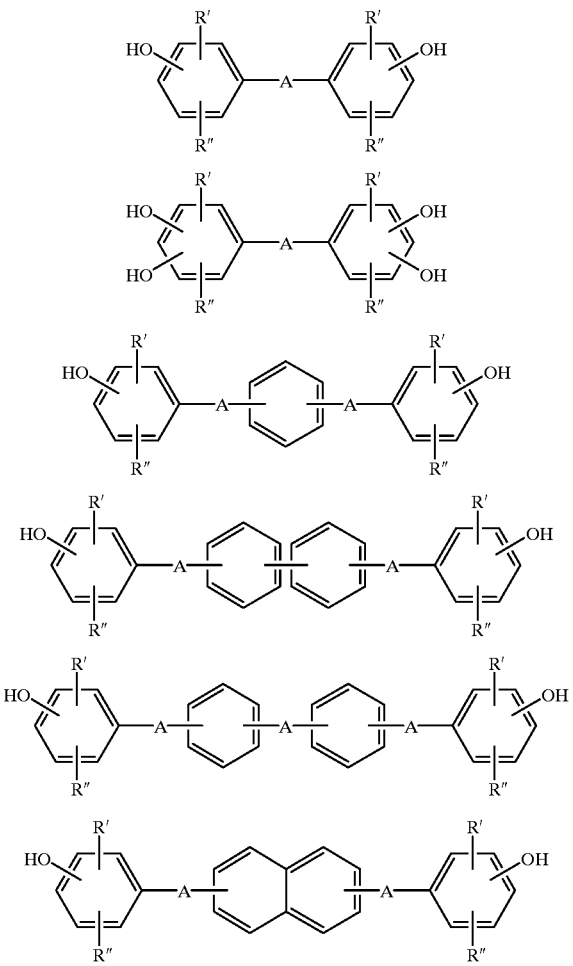

-continued

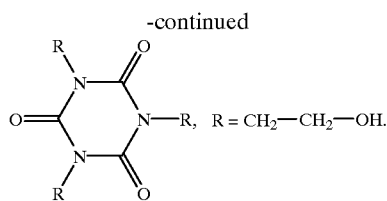

R = CH$_2$—CH$_2$—OH.

The hydroxyl groups can be in m-position, in particular in p-position, and R' and R" in these formulae can be alkyl containing 1 to 6 carbon atoms, halogen, such as chloro or bromo and, preferably, hydrogen atoms. A can be a direct bond, or —O—, —S—, —(O)S(O)—, —C(O)—, —P(O)(C$_1$–C$_{20}$alkyl)-, unsubstituted or substituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloro ethylidene, trichloroethylidene.

Particularly suitable polyesters are PET, PBT, PEN, PTT and the corresponding copolymers, PET and its copolymers being especially preferred. This process is also especially important for PET recyclates which are recovered, for example, from bottle collections, e.g. from collections of the beverages industry. These materials preferably consist of terephthalic acid, 2,6-naphthalenedicarboxylic acid and/or isophthalic acid in combination with ethylene glycol and/or 1,4-bis(hydroxymethyl)cyclohexane.

Polyester blends to be mentioned in particular are those containing polycarbonate.

Polycarbonate (PC) is to be understood as meaning both virgin polycarbonate and polycarbonate recyclate. PC is obtained, for example, from bisphenol A and phosgene or a phosgene analog, such as trichloromethylchloroformate, triphosgene or diphenylcarbonate, in the latter case by condensation usually with addition of a suitable transesterification catalyst, such as boron hydride, an amine such as 2-methylimidazole, or a quaternary ammonium salt; besides bisphenol A it is possible to additionally use other bisphenol components, and it is also possible to use halogenated monomers in the benzene nucleus. Particularly suitable bisphenol components to be mentioned are: 2,2-bis(4'-hydroxyphenyl)propane (bisphenol A), 2,4'-dihydroxydiphenylmethane, bis(2-hydroxyphenyl)methane, bis(4-hydroxyphenyl)methane, bis(4-hydroxy-5-propylphenyl)methane, 1,1-bis(4'-hydroxyphenyl)ethane, bis(4-hydroxyphenyl)cyclohexylmethane, 2,2-bis(4'-hydroxyphenyl)-1-phenylpropane, 2,2-bis(3',5'-dimethyl-4'-hydroxyphenyl)propane, 2,2-bis(3',5'-dibromo-4'-hydroxyphenyl)propane, 2,2-bis(3',5'-dichloro-4'-hydroxyphenyl)propane, 1,1-bis(4'-hydroxyphenyl)cyclododecane, 1,1-bis(3',5'-dimethyl-4'-hydroxyphenyl)cyclododecane, 1,1-bis(4'-hydroxyphenyl)-3,3,5-trimethylcyclohexane, 1,1-bis(4'-hydroxyphenyl)-3,3,5,5-tetramethylcyclohexane, 1,1-bis(4'-hydroxyphenyl)-3,3,5-trimethylcyclopentane and the bisphenols cited above. The polycarbonates can also be branched with suitable amounts of more than difunctional monomers (examples as indicated above for the polyesters).

The polyester copolymers or blends which can be used in the process of this invention are prepared in customary manner from the starting polymers. Preferred polyester components are PET, PBT, and a preferred PC component is a PC based on bisphenol-A. The ratio of polyester to PC is preferably 95:5 to 5:95, a ratio in which one component makes up at least 75% being particularly preferred.

Examples of unsubstituted or substituted alkylene are methylene, ethylene, phenylmethylene, diphenylmethylene, methylphenylmethylene. Examples of cycloalkylidene are cyclopentylidene, cyclohexylidene, cycloheptylidene and cyclooctylidene.

Examples of bisphenols are: bis(p-hydroxyphenyl) ether or bis(p-hydroxyphenyl) thioether, bis(p-hydroxyphenyl) sulfone, bis(p-hydroxyphenyl)methane, bis(4-hydroxyphenyl)-2,2'-biphenyl, phenylhydroquinone, 1,2-bis(p-hydroxyphenyl)ethane, 1-phenyl-bis(p-hydroxyphenyl)-methane, diphenyl-bis(p-hydroxyphenyl)methane, diphenyl-bis(p-hydroxyphenyl)ethane, bis-(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis(p-hydroxyphenyl)butane, 2,2-bis(p-hydroxyphenyl) hexafluoropropane, 1,1-dichloro- or 1,1,1-trichloro-2,2-bis(p-hydroxyphenyl)ethane, 1,1-bis(p-hydroxyphenyl) cyclopentane and, in particular, 2,2-bis(p-hydroxyphenyl) propane (bisphenol-A) and 1,1-bis(p-hydroxyphenyl) cyclohexane (bisphenol-C).

Suitable polyesters of hydroxycarboxylic acids are, for example, polycaprolactone, polypivalolactone or the polyester of 4-hydroxycyclohexanecarboxylic acid, 2-hydroxy-6-naphthalenecarboxylic acid or 4-hydroxybenzoic acid.

Those polymers which contain predominantly ester bonds but which may also contain other bonds, are also suitable, for example polyester amides or polyester imides.

Polyesters containing aromatic dicarboxylic acids have become very important, especially the polyalkylene terephthalates. Accordingly, the preferred moulding compositions of this invention are those in which the polyester is composed, based on the polyester, to at least 30 mol %, preferably to at least 40 mol %, of aromatic dicarboxylic acids and to at least 30 mol %, preferably to least 40 mol %, of alkylenediols containing preferably 2 to 12 carbon atoms.

In this case in particular, the alkylenediol is linear and contains 2 to 6 carbon atoms, such as ethylene glycol, tri-, tetra- or hexamethylene glycol and the aromatic dicarboxylic acid, terephthalic and/or isophthalic acid.

This invention is of particular importance in the case of polyester recyclates such as those obtained from production wastes, useful material collections or so-called obligatory returnables, for example from the automotive industry or from the electrical sector. These polycondensate recyclates have been damaged in many ways by heat and or hydrolysis. Moreover, these recyclates can also contain subordinate amounts of admixtures of plastic materials of different structures, for example polyolefins, polyurethanes, ABS or PVC. These recyclates can also contain admixtures via the usual impurities, for example colourant residues, adhesives, contact media or paint systems, traces of metal and water, traces of operating materials or inorganic salts.

It is preferred to use phosphonates of formula I

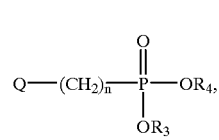

(I)

wherein
R$_3$ is H, C$_1$–C$_{20}$alkyl, unsubstituted or C$_1$–C$_4$alkyl-substituted phenyl or naphthyl,
R$_4$ is hydrogen, C$_1$–C$_{20}$alkyl, unsubstituted or C$_1$–C$_4$alkyl-substituted phenyl or naphthyl; or $M^{r+}/r$, $M^{r+}$ is an r-valent metal cation or the ammonium ion, n is 0, 1, 2, 3, 4, 5 or 6, and r is 1, 2, 3 or 4;

Q is hydrogen, —X—C(O) OR$_7$, or a radical

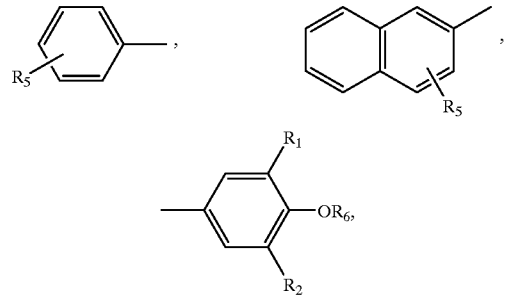

R$_1$ is isopropyl, tert-butyl, cyclohexyl or cyclohexyl which is substituted by 1–3 C$_1$–C$_4$alkyl groups, R$_2$ is hydrogen, C$_1$–C$_4$alkyl, cyclohexyl or cyclohexyl which is substituted by 1–3 C$_1$–C$_4$alkyl groups, R$_5$ is H, C$_1$–C$_{18}$alkyl, OH, halogen or C$_3$–C$_7$cycloalkyl;

R$_6$ is H, methyl, trimethylsilyl, benzyl, phenyl, sulfonyl or C$_1$–C$_{18}$alkyl;

R$_7$ is H, C$_1$–C$_{10}$alkyl or C$_3$–C$_7$cycloalkyl; and

X is phenylene, or phenylene or cyclohexylene substituted by C$_1$–C$_4$alkyl groups.

Other suitable phosphonates are listed below.

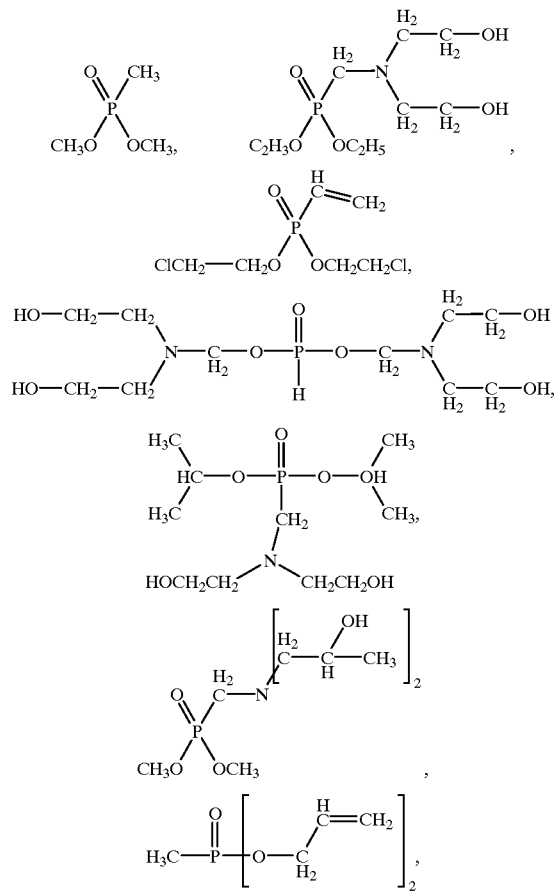

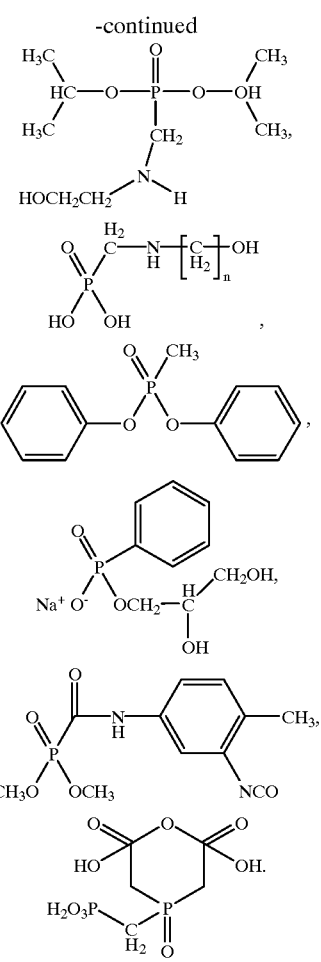

It is preferred to use sterically hindered hydroxyphenyl-alkyl-phosphonic acid esters or half-esters, such as those disclosed in U.S. Pat. No. 4,778,840.

Particularly preferred compounds are those of formula Ia

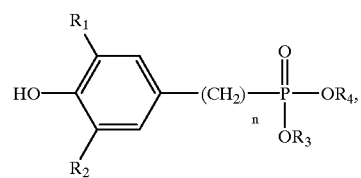

(Ia)

wherein

R$_1$ is H, isopropyl, tert-butyl, cyclohexyl or cyclohexyl which is substituted by 1–3 C$_1$–C$_4$alkyl groups, R$_2$ is hydrogen, C$_1$–C$_4$alkyl, cyclohexyl or cyclohexyl which is substituted by 1–3 C$_1$–C$_4$alkyl groups, R$_3$ is C$_1$–C$_{20}$alkyl, unsubstituted or C$_1$–C$_4$alkyl-substituted phenyl or naphthyl, R$_4$ is hydrogen, C$_1$–C$_{20}$alkyl, unsubstituted or C$_1$–C$_4$alkyl-substituted phenyl or naphthyl; or $M^{r+}/r$, $M^{r+}$ is an r-valent metal cation, n is 1, 2, 3, 4, 5 or 6, and r is 1, 2, 3 or 4.

Halogen is fluoro, chloro, bromo or iodo.

Any substituents defined as alkyl containing up to 18 carbon atoms are suitably radicals such as methyl, ethyl, propyl, butyl, pentyl, hexyl and octyl, stearyl and the corresponding branched isomers; $C_2$–$C_4$alkyl being preferred.

$C_1$–$C_4$Alkyl-substituted phenyl or naphthyl preferably containing 1 to 3, more preferably 1 or 2, alkyl groups, is typically o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 1-methyinaphthyl, 2-methylnaphthyl, 4-methylnaphthyl, 1,6-dimethylnaphthyl or 4-tert-butylnaphthyl.

$C_1$–$C_4$Alkyl-substituted cyclohexyl preferably containing 1 to 3, more preferably 1 or 2, branched or unbranched alkyl groups is typically cyclopentyl, methylcyclopentyl, dimethylcyclopentyl, cyclohexyl, methylcyclohexyl, dimethylcyclohexyl, trimethylcyclohexyl or tertbutylcyclohexyl.

A mono-, di-, tri- or tetra-valent metal cation is preferably an alkali metal, alkaline earth metal, heavy metal or aluminium cation, for example $Na^+$, $K^+$, $Mg^+$, $Ca^{++}$, $Ba^{++}$, $Zn^{++}$, $Al^{+++}$, or $Ti^{++++}$. $Ca^{++}$ is particularly preferred.

Preferred compounds of formula I are those which contain at least one tert-butyl group as $R_1$ or $R_2$. Very particularly preferred compounds are those, wherein $R_1$ and $R_2$ are simultaneously tert-butyl.

n is preferably 1 or 2 and, very particularly preferably, 1.

Very particularly preferred sterically hindered aryl-alkyl-phosphonic acid esters or half-esters are the compounds of formula II, III, IV, V and VI

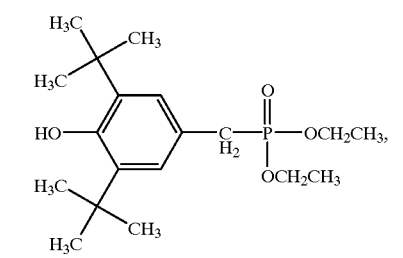
(II)

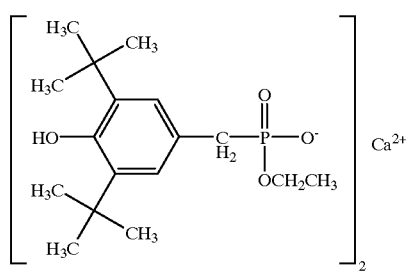
(III)

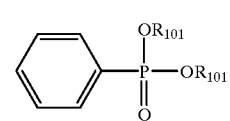
(IV)

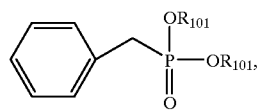
(V)

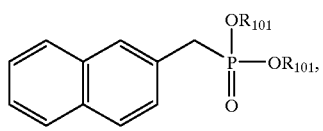
(VI)

wherein each $R_{101}$ is independently of the other hydrogen, ethyl, phenyl or $M^{r+}/r$. The meanings of $M^{r+}/r$ have been given above.

Some of the compounds II, III, IV, V and VI are commercially available or else they can be prepared by standard processes.

It is preferred to use 0.01 to 5 parts, particularly preferably 0.02 to 2 parts, most preferably 0.05 to 1 parts, of phosphonate, based on 100 parts of polycondensate.

In addition to the novel phosphonates it is also possible to add other stabilisers to the polyesters. The skilled person is familiar with these further stabilisers and they are chosen depending on the specific end product requirements. In particular, fluorescent whitening agents, light stabilisers or also antioxidants may be added ("Plastics Additives Handbook", Ed. R. Gächter and H. Müller, Hanser Verlag, 3. Ed., 1990; especially pp. 88/89, 92/94, 251/252 and 258/259). It is also possible to add other additives, for example lubricants, demoulding agents, nucleating agents, fillers or reinforcing agents, such as glass fibres, flame retardants, antistatic agents and, in particular in the case of PET/PC, PBT/PC recyclates, additives which prevent transesterification during processing.

Particularly suitable compounds to be mentioned are:
1. Antioxidants
1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl- 4-hydroxyanisole, 3,5-di-tert-butyl-4-hydroxyphenyl stearate, bis(3,5-di-tert-butyl-4-hydroxyphenyl) adipate.
1.4. Tocopherols, for example α-tocopherol, β-tocopherol, γ-tocopherol, δ-tocopherol and mixtures thereof (Vitamin E).
1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octyimercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)-isocyanurate.

1.11. Acylaminophenols, for example 4-hydroxylauranilide, 4-hydroxystearanilide, octyl N-(3,5-di-tert-butyl-4-hydroxyphenyl)carbamate.

1.12. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl]oxamide (Naugard®XL-1 supplied by Uniroyal).

1.17. Ascorbic acid (vitamin C)

1.18. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)

propane, (o-tolyl)biguanide, bis[4-(1',3'-dimethylbutyl) phenyl]amine, tertoctylated N-phenyl-1-naphthylamine, a mixture of mono- and dialkylated tert-butyl/tertoctyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotrazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy) carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxy phenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl), n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane-tetracarboxylate, 1,1'-(1,2-ethanediyl)-bis(3,3, 5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2, 4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4, 6-trichloro-1,3,5-triazine as well as 4-butylamino-2,2,6,6-tetramethylpiperidine (CAS Reg. No. [136504-96-6]); N-(2, 2,6,6-tetramethyl-4-piperidyl)-n-dodecylsuccinimid, N-(1, 2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis-(1,2,2,6,6-pentamethyl-4-piperidyloxycarbonyl)-2-(4-methoxyphenyl)ethane, N,N'-bis-formyl-N,N'-bis(2,2,6,6-tetramethyl-4-piperidyl) hexamethylenediamine, diester of 4-methoxy-methylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethytoxanlide, N,N'-bis(3-dimethyiaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)- 6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicylaoyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butyl-phenyl)pentaerythritol diphosphite, tristearyl sorbitol triphosphite, tetrakis(2,4-di-tert-butyl-phenyl) 4,4'-biphenylene diphosphonite, 6-isooctyloxy-2,4,8,10-tetra-tert-butyl-12H-dibenz-[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyldibenz[d,g]-1,3,2-dioxaphosphocin, 2,2',2"-nitrilo[triethyltris(3,3',5,5'-tetra-tert-butyl-1,1'-biphenyl-2,2'-diyl)-phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphiran.

Especially preferred are the following phosphites:

Tris(2,4-di-tert-butylphenyl) phosphite (Irgafos®168, Ciba-Geigy), tris(nonylphenyl) phosphite, (A)

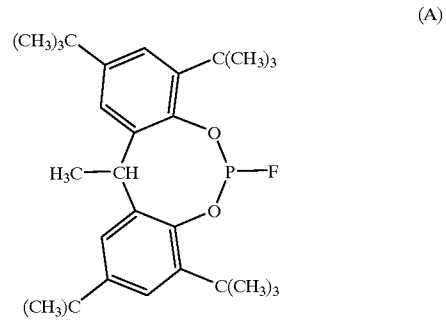

(B)

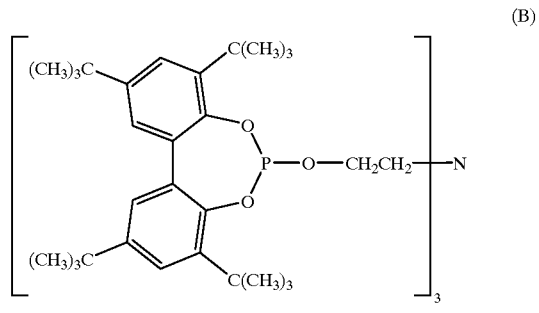

(C)

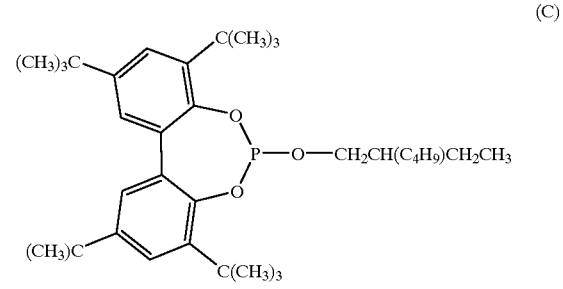

(D)

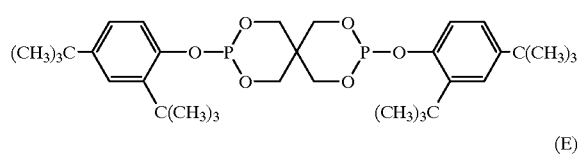

(E)

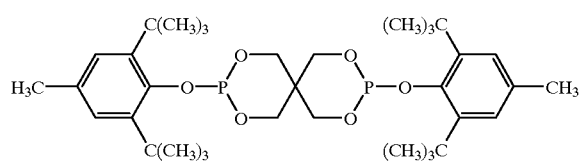

(F)

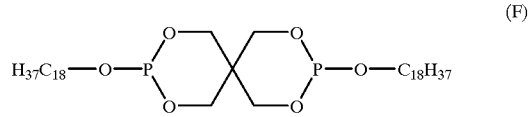

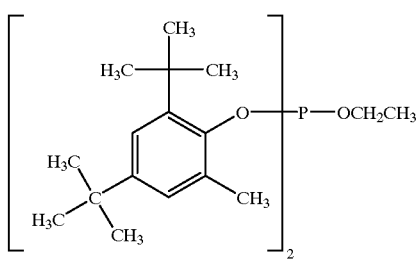

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N, N-dialkylhydroxylamine derived from hydrogenated tallow amine.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Particularly preferred are 1,3:2,4-bis(3',4'-dimethylbenzylidene)sorbitol, 1,3:2,4-di(paramethyldibenzylidene)sorbitol and 1,3:2,4-di(benzylidene)sorbitol.

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

14. Fluorescent whitening agents, such as those listed in "Plastics Additives Handbook", Ed. R. Gächter and H. Müller, Hanser Verlag, 3rd Ed., 1990, pages 775–789.

Of these compounds, light stabilisers of the classes 2.1, 2.5 and 2.7 are preferred, for example light stabilisers of the Chimassorb 944, Chimassorb 119, Tinuvin 234, Tinuvin 312, Tinuvin 622 or Tinuvin 770 type. Other preferred compounds are aromatic phosphites or phosphonites.

The phosphonates can be added in the form of liquids, powders, granules or in compacted form, or also on a support material such as silica gel or together with a polymer powder or wax, such as a polyethylene wax.

It is preferred to add 0.01 to 5 parts of phosphonate to 100 parts each of polyester. The amount depends on the initial molecular weight of the polymer and on the desired final molecular weight. Accordingly, higher amounts are preferably used in the case of a severely damaged polycondensate, i.e. one having a low molecular weight. If, on the other hand, only a slight increase of the molecular weight is desired, then the phosphonate is used in low concentration.

It is also possible to control the final molecular weight via the process conditions, for example via the reaction time, the temperature and, in particular, via degassing.

If the polyester is a recyclate, then it can also be used together with virgin material. Stabilisation/increase of molecular weight can take place independently of each other.

This invention also relates to polycondensates obtainable by the novel process.

The following Examples illustrate the invention in more detail. As in the remainder of the description, parts and percentages are by weight, unless otherwise stated.

EXAMPLES 1–5

One Vent Zone

The polyethylene therephthalates listed in Table 1 are charged without predrying with phosphonate 1 or phosphonate 2 and are processed with melt degassing.

Processing conditions:

Closely intermeshing twin-screw extruder ZSK 30, of Werner & Pfleiderer, with screws rotating in the same direction.

Screw diameter 30 mm, processing stretch 37 D.

The screw is divided into a feed section of 3 D, a transition section of 12 D, a vent zone of 18 D and a metering zone of 4D stretch.

Throughput 5 kg/h at a screw rotation of 150 rpm and at a constant temperature of 270° C.

The degassing pressure is 40 mbar.

The results are compiled in the Table. The molecular weights are determined via gel permeation chromatography relative to a polystyrene standard.

TABLE 1

| No. | Material | $M_w$ prior to extrusion | Addition (%) | $M_w$ after extrusion | % Increase |
|---|---|---|---|---|---|
| 1 | PET T86 (Hoechst) | 58 000 | 0.2 phosphonate 1 | 62 000 | 7 |
| 2 | PET T86 (Hoechst) | 58 000 | 0.5 phosphonate 1 | 64 000 | 10 |
| 3 | recycling material to be ground (REKO) | 50 000 | 0.2 phosphonate 2 | 58 000 | 16 |
| 4 | recycling material to be ground (REKO) | 50 000 | 0.5 phosphonate 1 | 71 000 | 42 |
| 5 | PET T78 (Hoechst) | 54 000 | 0.2 phosphonate 1 | 60 000 | 11 |
| comp. 1* | PET T86 (Hoechst) | 58 000 | 0.2 phosphonate 1 | 36 000 | — |

*The comparison test is carried out under identical conditions but without degassing.
Phosphonate 1: diethyl (3,5-di-tert-butyl-4-hydroxybenzyl)phosphonate
Phosphonate 2: calcium bis(monoethyl(3,5-di-tert-butyl-4-hydroxybenzyl) phosphonate

EXAMPLES 6–17

One Vent Zone

The polyesters and additives (Table 2) are fed separately and gravimetrically into the extruder. The polyester samples are used without predrying.

The tests are carried out as in Examples 1–5 using a closely intermeshing twin-screw extruder ZSK30 (Werner & Pfleiderer) with screws rotating in the same direction.

Processing conditions:

processing temperature: 270° C.
screw diameter: 30 mm
processing stretch: 41D
feed section: 8D
transition section: 7D
return: 1D
vent zone: 21D
metering zone: 4D
throughput: 5 kg/h
screw rotation: 150 rpm
degassing pressure: see Table 2

The influence on the molecular weight is determined via measurement of the MFR (melt flow rate) value in accordance with ISO 1133 using predried granules (>12 h at 80° C. under vacuum). A low MFR value corresponds to a higher molecular weight.

The individual values are compiled in Table 2.
The phosphonates 1, 3, 4 and 5 are used.

phosphonate 3

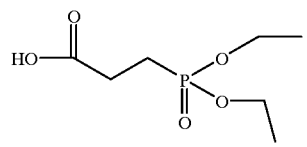

phosphonate 4

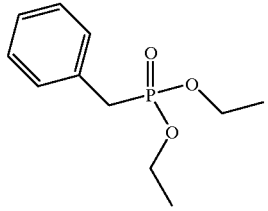

phosphonate 5

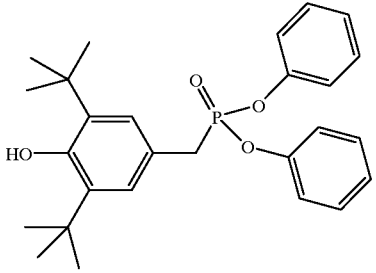

TABLE 2

| | Polyester | Addition | Vacuum [mbar] | MFR (260/1.2) |
|---|---|---|---|---|
| comparison 2 | PET T86 (Hoechst) | none | 1013 | 46.9 |
| comparison 3 | PET T86 (Hoechst) | none | <5 | 25.2 |
| Example 6 | PET T86 (Hoechst) | 0.20% phosphonate 1 | 150 | 21.6 |
| comparison 4 | PET 5011 Eastman | none | <5 | 33.7 |
| Example 7 | PET 5011 Eastman | 0.20% phosphonate 1 | <5 | 29.1 |
| comparison 5 | PET DN004 Eastman DMT process | none | 220 | 18.7 |
| Example 8 | PET DN004 Eastman DMT process | 0.20% phosphonate 1 | 240 | 11.8 |
| comparison 6 | PET RT48 (Hoechst) PTA process | none | <5 | 37.9 |
| Example 9 | PET RT48 (Hoechst) PTA process | 0.05% phosphonate 1 | <5 | 33.4 |
| Example 10 | PET RT48 (Hoechst) PTA process | 0.20% phosphonate 3 | <5 | 36.5 |
| Example 11 | PET RT48 (Hoechst) PTA process | 0.20% phosphonate 4 | <5 | 27.7 |
| Example 12 | PET RT48 (Hoechst) PTA process | 0.20% phosphonate 5 | <5 | 26.8 |

What is claimed is:

1. A process for increasing the molecular weight of polyesters, copolyesters or polyester blends by adding one or more than one phosphonate to the processing apparatus and fusing the mixture to above the melting point, in which process the processing apparatus is a single-screw extruder, twin-screw extruder, planetary-gear extruder, ring extruder or Ko-kneader having at least one vent zone to which underpressure is applied.

2. A process according to claim 1, which comprises applying an underpressure of less than 250 mbar to the vent zone.

3. A process according to claim 1, wherein the processing apparatus is a closely intermeshing twin-screw extruder with screws rotating in the same direction and having a feed section, a transition section, at least one vent zone and a metering zone, the vent zone being separated from the transition section or from a further vent zone by a fusible plug.

4. A process according to claim 1, which comprises using a processing apparatus having 1–4 vent zones.

5. A process according to claim 1, wherein the processing stretch is 1 to 60 screw diameters.

6. A process according to claim 1, which process is carried out at a screw revolution rate of 25 to 1200 revolutions per minute.

7. A process according to claim 1, wherein the maximum melt temperature is in the range from 180° to 320° C.

8. A process according to claim 1, which comprises using a phosphonate of formula I

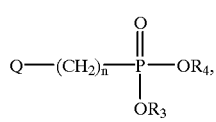

(I)

wherein $R_3$ is H, $C_1$–$C_{20}$alkyl, unsubstituted or $C_1$–$C_4$alkyl-substituted phenyl or naphthyl, $R_4$ is hydrogen, $C_1$–$C_{20}$alkyl, unsubstituted or $C_1$–$C_4$alkyl-substituted phenyl or naphthyl; or $M^{r+}/r$, $M^{r+}$ is an r-valent metal cation or the ammonium ion, n is 0, 1, 2, 3, 4, 5 or 6, and r is 1, 2, 3 or 4;

Q is hydrogen, —X—C(O)—OR$_7$, or a radical

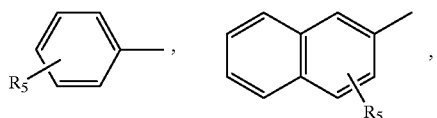

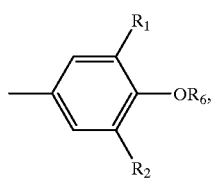

$R_1$ is isopropyl, tert-butyl, cyclohexyl or cyclohexyl which is substituted by 1–3 $C_1$–$C_4$alkyl groups, $R_2$ is hydrogen, $C_1$–$C_4$alkyl, cyclohexyl or cyclohexyl which is substituted by 1–3 $C_1$–$C_4$alkyl groups, $R_5$ is H, $C_1$–$C_{18}$alkyl, OH, halogen or $C_3$–$C_7$cycloalkyl;

$R_6$ is H, methyl, trimethylsilyl, benzyl, phenyl, sulfonyl or $C_1$–$C_{18}$alkyl;

$R_7$ is H, $C_1$–$C_{10}$alkyl or $C_3$–$C_7$cycloalkyl; and

X is phenylene, or phenylene or cyclohexylene substituted by $C_1$–$C_4$alkyl groups.

9. A process according to claim 8, which comprises using compounds of formula Ia

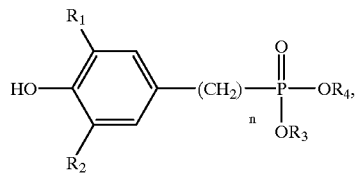

(Ia)

wherein $R_1$ is H, isopropyl, tert-butyl, cyclohexyl or cyclohexyl which is substituted by 1–3 $C_1$–$C_4$alkyl groups, $R_2$ is hydrogen, $C_1$–$C_4$alkyl, cyclohexyl or cyclohexyl which is substituted by 1–3 $C_1$–$C_4$alkyl groups, $R_3$ is $C_1$–$C_{20}$alkyl, unsubstituted or $C_1$–$C_4$alkyl-substituted phenyl or naphthyl, $R_4$ is hydrogen, $C_1$–$C_{20}$alkyl, unsubstituted or $C_1$–$C_4$alkyl-substituted phenyl or naphthyl; or $M^{r+}/r$, $M^{r+}$ is an r-valent metal cation, n is 1, 2, 3, 4, 5 or 6, and r is 1, 2, 3 or 4.

10. A process according to claim 1, which comprises using a compound of formula II, III, IV, V or VI

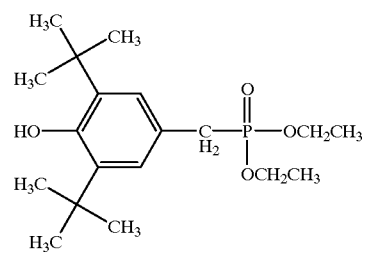

(II)

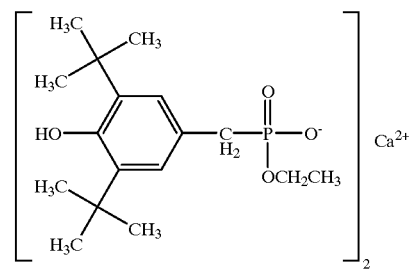

(III)

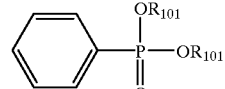

(IV)

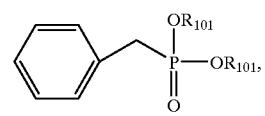

(V)

-continued

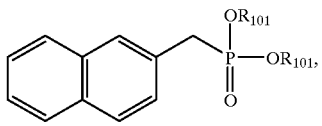

(VI)

wherein each $R_{101}$ is independently of the other hydrogen or $M^{r+}/r$.

11. A process according to claim 1, which comprises using 0.01 to 5 parts of phosphonate per 100 parts of polycondensate.

12. A process according to claim 1, wherein the polyester is PET, PBT, PEN, PTT or a corresponding copolyester or a recyclate of these polymers/copolymers.

13. A polyester obtainable by a process according to claim 1.

* * * * *